(12) United States Patent
Meharchand et al.

(10) Patent No.: US 7,370,165 B2
(45) Date of Patent: May 6, 2008

(54) APPARATUS AND METHOD FOR PROTECTING DATA RECORDING ON A STORAGE MEDIUM

(75) Inventors: Dennis Meharchand, Toronto (CA); Tony Kwok Leung, Willowdale (CA)

(73) Assignee: Valt.X Technologies Inc., Toronto (CA)

( * ) Notice: Subject to any disclaimer, the term of this patent is extended or adjusted under 35 U.S.C. 154(b) by 146 days.

(21) Appl. No.: 10/450,849

(22) PCT Filed: Dec. 27, 2001

(86) PCT No.: PCT/CA01/01828

§ 371 (c)(1),
(2), (4) Date: Jan. 20, 2004

(87) PCT Pub. No.: WO02/054251

PCT Pub. Date: Jul. 11, 2002

(65) Prior Publication Data

US 2004/0186971 A1    Sep. 23, 2004

Related U.S. Application Data

(63) Continuation-in-part of application No. 09/798,522, filed on Mar. 3, 2001, now Pat. No. 6,766,478.

(60) Provisional application No. 60/282,188, filed on Apr. 9, 2001, provisional application No. 60/271,710, filed on Feb. 28, 2001.

(30) Foreign Application Priority Data

Dec. 29, 2000    (TW) .............................. 89128355 A
Jan. 9, 2001     (CN) .............................. 01 1 00603
Mar. 12, 2001    (CA) .............................. 2340479

(51) Int. Cl.
*G06F 12/06*    (2006.01)

(52) U.S. Cl. ..................................... 711/163; 711/203
(58) Field of Classification Search ................ 711/111, 711/114, 152, 153, 163, 203, 207, 164; 714/6, 714/15; 709/203
See application file for complete search history.

(56) References Cited

U.S. PATENT DOCUMENTS

| | | | |
|---|---|---|---|
| 5,325,519 A * | 6/1994 | Long et al. .................... | 714/15 |
| 5,564,040 A | 10/1996 | Kubala | |
| 5,568,629 A * | 10/1996 | Gentry et al. ................ | 711/114 |
| 5,586,301 A * | 12/1996 | Fisherman et al. .......... | 711/152 |
| 5,657,470 A * | 8/1997 | Fisherman et al. .......... | 711/153 |
| 5,754,821 A | 5/1998 | Cripe et al. | |
| 5,878,202 A * | 3/1999 | Sakuma ......................... | 714/6 |
| 5,890,014 A | 3/1999 | Long | |
| 6,052,781 A | 4/2000 | Weber | |
| 6,148,412 A | 11/2000 | Cannon et al. | |
| 6,170,063 B1 | 1/2001 | Golding | |
| 6,182,198 B1 | 1/2001 | Hubis et al. | |
| 6,202,135 B1 | 3/2001 | Kedem et al. | |
| 6,205,527 B1 | 3/2001 | Goshey et al. | |
| 6,317,845 B1 | 11/2001 | Meyer et al. | |
| 6,324,627 B1 * | 11/2001 | Kricheff et al. .............. | 711/163 |
| 6,345,346 B1 | 2/2002 | Biessener et al. | |
| 6,453,334 B1 * | 9/2002 | Vinson et al. ................ | 709/203 |
| 6,484,269 B1 | 11/2002 | Kopylovitz | |
| 6,488,581 B1 | 12/2002 | Stockdale | |
| 6,502,205 B1 | 12/2002 | Yanai et al. | |
| 6,591,376 B1 | 7/2003 | VanRooven et al. | |
| 6,615,350 B1 | 9/2003 | Schell et al. | |
| 6,766,478 B2 | 7/2004 | Leung | |
| 6,792,519 B2 * | 9/2004 | Constable et al. ........... | 711/163 |
| 6,874,060 B2 * | 3/2005 | Blood et al. ................. | 711/111 |
| 6,961,833 B2 | 11/2005 | Leung | |
| 2002/0029311 A1 * | 3/2002 | Joyeau et al. ................ | 710/310 |
| 2002/0161891 A1 | 10/2002 | Higuchi et al. | |

FOREIGN PATENT DOCUMENTS

EP        0 965 903 A1    12/1999
WO    PCT/US99/11999    12/1999

OTHER PUBLICATIONS

Hyper Technologies, Deep Freeze (overview and installation instructions), 1999-2000.

Juzt-Reboot Data Recovery Card (printout from website: http://www/juzt-reboot.com, 2001.

\* cited by examiner

*Primary Examiner*—Pierre-Michel Bataille
(74) *Attorney, Agent, or Firm*—Bereskin & Parr (57) ABSTRACT

A controller for protecting data on a data storage medium is disclosed. A single physical data storage device is divided into a protected data space, a virtual data space and an unprotected data space in an installation mode. Subsequently, the protected and unprotected data space are presented as two separate physical data storage devices and the existence of virtual data space is concealed. The two data storage devices are respectively represented as having capacity equal to that of the protected and unprotected data space only. A set of protected data (which may include software and data) is initially installed in the protected data space. During use, data transmitted to the controller for recording in the data storage space is recorded only in the virtual data space. Data may be read from either the protected data space or the virtual data space, depending on whether the virtual data space contains newer data. In one embodiment, the contents of the virtual data space are discarded at the beginning of each session of the computing system in which the controller is installed. In another embodiment, the virtual data space is discarded only when the controller is instructed to do so and the contents of the virtual data space may be made permanent by copying them to the protected data space. The protected data space and virtual data space may be located on different data storage devices. The controller may also receive read data and write data requests for an unprotected data space, which may be used to record data permanently, independent of the protected and virtual data spaces.

9 Claims, 5 Drawing Sheets

APPARATUS AND METHOD FOR PROTECTING DATA RECORDING ON A STORAGE MEDIUM

FIELD OF THE INVENTION

This invention relates to data protection. More particularly, the invention relates to a data protection controller for preventing data recorded on a data storage medium from being corrupted, modified or deleted.

BACKGROUND OF THE INVENTION

Almost all computer and computing devices utilize electronic memory devices for recording operating system software, application software and data, which will generally be referred to collectively as data, in this patent. A common problem that has developed with such devices is unauthorized modification of the recorded data. In some cases, such modifications are intentional, as in the case of a user changing the configuration of a software program or storing new data in the memory.

Often these "friendly" modifications will have undesirable results that require the configuration of the computer to be restored or modified again. In other cases, the modifications may be malicious, as in the case of the deletion or modification of recorded data by a virus or an unauthorized person. In general, these "unfriendly" modifications will have undesirable consequences, which may be destructive and substantial.

Computer users, and particularly businesses, can suffer substantial losses in productivity, revenue and profits when their computer systems are modified without authorization. In a business environment where a number of persons are provided with computer systems, it is often desirable that each of the computers have the same configuration. This allows the systems to be configured and used uniformly. It is not desirable that each user provided with such a computer modify the configuration to suit that user's preferences, since this can (i) lead to an incompatibility between the user's computers and the other computer (ii) prevent another user from utilizing the modified computer in a uniform way and (iii) result in the modified computer becoming partially or wholly inoperable, reducing productivity and requiring costly attention from the business's computer support team.

In other cases, it may be desirable to allow users to make modifications to data on a storage medium, but to provide a "snapshot" of the medium from a point at which it was properly configured. In this case, the user may modify the configuration of the computer by adding, deleting or changing software or by editing data on the storage medium. If the user's modification cause the computer to become inoperable, then the data on the storage medium can be restored to its state at the time of the snapshot.

Several devices which attempt to preventing unauthorized modification of software and data stored on a computer hard disk drive are available. Some of these devices attempt to provide a combined hardware/software solution to the problem described above. Other devices attempt to provide a software only solution.

Systems which rely only on software protection will typically intercept any attempt to write data onto or read data from the hard disk, drive. The data is written onto a special memory space but the original data on the hard disk drive is not modified. If the written data is requested in a subsequent data read request, it is read from the special memory space rather than from the hard disk drive. The new data may be accessed only during the same session of computer use and is deleted or discarded when the computer is re-started or on request. This solution has a substantial disadvantage. Malicious software programs, such as viruses, can detect the presence of the protective software and either circumvent or disable it. Furthermore, these systems are unable to conceal the special memory space from the computer system, allowing the malicious software to access it (possibly using low-level data I/O requests. The malicious software can then proceed to make modifications to the data recorded on the hard disk drive, potentially causing the problems set out above. Furthermore, a software solution is generally operating system and/or processor dependent.

Systems which provide a combined hardware and software solution will typically include a card that fits into a PCI or other expansion slot on a computer and a software package. The software package is used to configure the card and may also be used to intercept read and write requests and direct them to a processor on the card. These systems also do not mask from the computer system the any special memory space on the hard drive that is used by the protective system and therefore, suffer from a similar problem susceptibility to detection by malicious software and may also be circumvented.

Accordingly, there is a need for a data protection system which is not operating system or processor dependent and which cannot be circumvented or disabled by malicious software or a malicious user.

SUMMARY OF THE INVENTION

The present invention provides a data protection controller that is interposed between a processor (such as a microprocessor or microcontroller) of a computing system and a data storage device (such as hard disk drive, floppy drive, memory stick). The controller is used to create and maintain a protected data space and a virtual data space on the data storage device. After the creation of the protected data space and the virtual data spaces, the controller conceals the virtual data space from the processor. The controller presents the data storage device to the processor as having a capacity equal to that of the protected data space only.

Initially, an administrator or other authorized person records protected data (which may include operating system software, application software and data) in the protected data space using a configuration and installation method. A protected data storage table is maintained to record the location within the protected data space at which each particular piece of protected data is recorded.

Subsequently, the controller is operated in a protect mode in which the protected data recorded in the protected data space can be read but cannot be overwritten. Data that is read from the protected data space, as well as data which is intended to be recorded in the protected data space is recorded in the virtual data space virtual. During the same session of use of the computing system, the virtual data is used in preference to the protected data, allowing the virtual data to be reviewed and modified. However, at the beginning of each new session of the protected data storage table is read by the controller into an internal data storage table, but the virtual data space is ignored and treated as it is empty. Any data recorded in virtual data space during the previous session is discarded. The controller thus eliminates the effect of undesired changes to the protected data by unauthorized users and malicious software such as viruses.

In another embodiment, changes to the virtual data space are not discarded at the beginning of each session. A virtual data storage table is also maintained and read in by the controller at the start of each session. However, the controller may be instructed to discard the virtual data by deleting its internal data storage table and then reading in only the protected data storage table.

In yet another embodiment, changes recorded in the virtual data space may be made permanent by instructing the controller to copy them into the protected data space.

The controller may also allow an unprotected data space to be maintained, allowing a user to record unprotected data which is not discarded when the virtual data is discarded. In this embodiment, the protected and unprotected data space is presented to the controller as separate data storage devices, even though they may in fact be located in separate logical partitions on a single physical data storage device.

The controller is compatible with redundancy and error correction method such as RAID, adding a data protection component to the security provided by that method.

BRIEF DESCRIPTION OF THE DRAWINGS

A preferred embodiment of the present invention will now be described in detail with reference to the drawings, in which.

DETAILED DESCRIPTION OF THE PREFERRED EMBODIMENT

Figure 1:
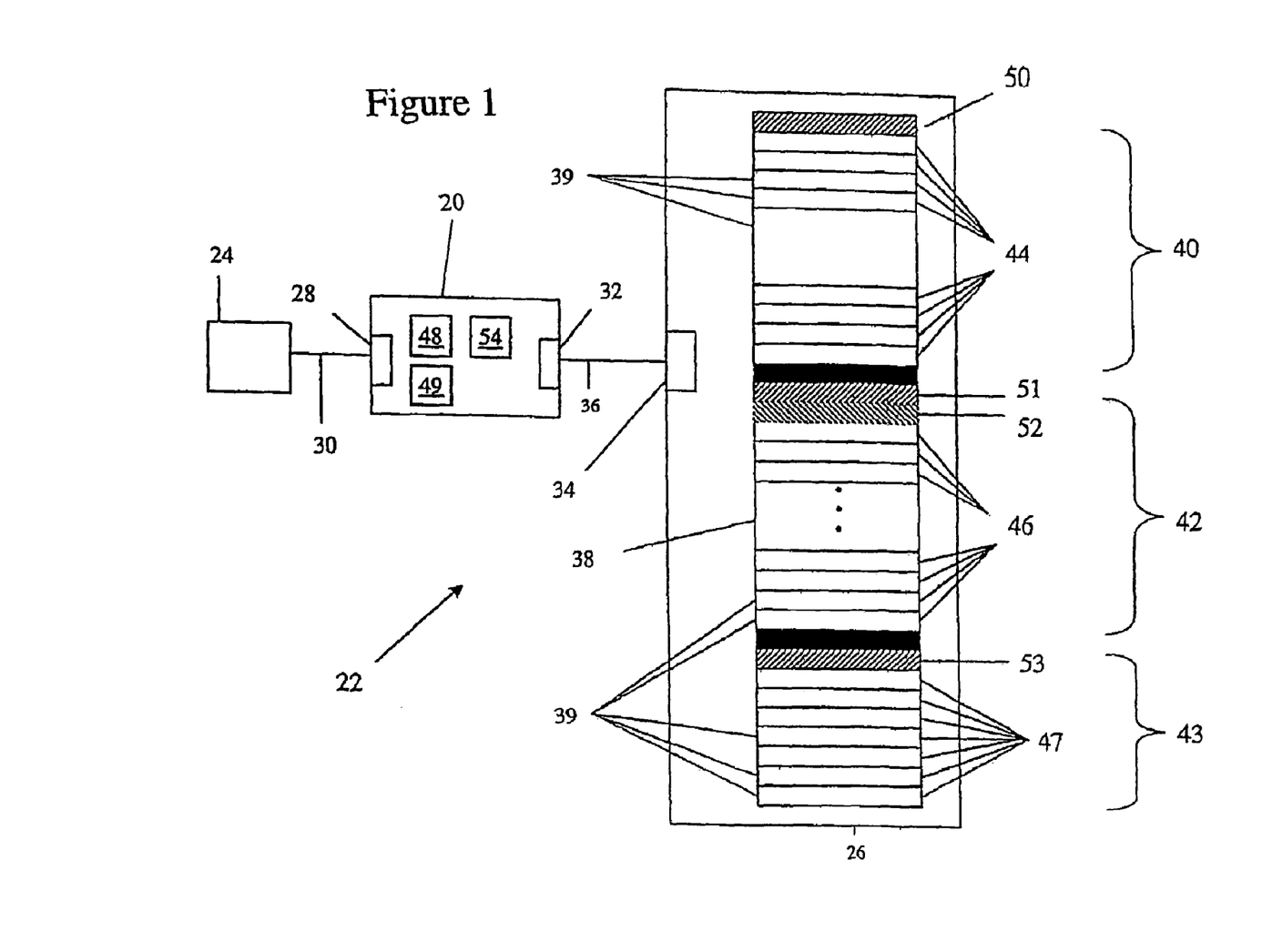
FIG. 1 is block diagram of a first computing system incorporating a first embodiment of a data protection controller according to the present invention.

Reference is first made to FIG. 1, which illustrates a computing system 22 incorporating a first embodiment of a data protection controller 20 according to the present invention. Computing system 22 includes a processor 24 and a data storage device 26.

Computing system 22 may be any type of device that requires software and/or data to be stored in a storage device. For example, computing system 22 may be a typical personal computer. In this case, processor 24 will be the microprocessor which operates the computer and data storage device 26 may be a hard disk drive (HDD) or other storage device. As another example, computing system 22 may be a game console. In this case, processor 24 will be the microprocessor or microcontroller which operates the console and data storage device 26 may be a solid state memory device such as a "memory stick", etc.

Processor 24 is coupled to a processor interface 28 of controller 20 by a processor data bus 30. Processor 24 makes read data requests and write data requests to controller 20 using processor data bus 30. A data device interface 32 of controller 20 is coupled to a controller interface 34 of data storage device 26 by a storage device data bus 36. Controller 20 reads data from and writes data to data storage device 26 using storage device data bus 36, based on read data and write data requests received from processor 24.

Preferably, processor interface 28 is identical to controller interface 34. This allows controller 20 to be interposed in the coupling between processor 24 and data storage device 26.

Data storage device 26 contains a data storage space 38, which is divided into a number of data blocks 39, each of which is capable of recording a limited amount of data. Blocks 39 may be designated to be protected data blocks 44, virtual data blocks 46 and unprotected data blocks 47. Data storage space 38 is divided into three data spaces: a protected data space 40 comprising protected data blocks 44, a virtual data space 42 comprising virtual data blocks 46 and an unprotected data space 43 comprising unprotected data blocks 47. Preferably, the number of protected data blocks 44 in protected data space 40 is equal to the number of virtual data blocks 46 in virtual data space data 42 so that each virtual data block 46 corresponds to a protected data block.

Protected data space 40 contains a protected data storage table 50. Protected data storage table 50 contains a record for each protected block that is used to record whether each particular protected block 44 is in use and, if it is in use, the specific data recorded in the protected block and the relationship of the block to other protected blocks that contain associated data. (For example, if a data file spans several blocks, the blocks may be joined together in a linked list.) Data recorded in protected data space 40 is referred to as "protected data".

Virtual data space 42 contains a virtual data storage table 51 which is used in a manner analogous to protected data storage table 50. In addition, virtual data space 42 contains a virtual block usage table 52 that is used to indicate which virtual blocks 46 contain valid virtual data. Typically, virtual block usage table 52 will contain one bit corresponding to each virtual block 46. If a particular bit is set to "1", then the corresponding virtual block 46 contains valid virtual data. If the bit is set to "0", the corresponding virtual block 46 does not contain valid virtual data. Data recorded in virtual data space 42 is referred to as "virtual data".

Unprotected data space 43 also contains an unprotected data storage table 53, which is also used in a manner analogous to protected data storage table 50. Data recorded in unprotected data space 43 is referred to as "unprotected data".

Controller 20 contains a protected space usage table 48, which is used to hold a copy of protected data storage table 50 when controller 20 is in use. Controller 20 also contains a virtual space usage table 49, which is used to hold copies of both virtual data storage table 51 and virtual block usage table 52 when controller 20 is in use. In the preferred embodiment of the present invention, controller 20 does not record the location of data stored in unprotected data space, although this may be done within the scope of the invention.

Controller 20 also contains a local memory space 54, which is used to buffer data while it is read from or written to protected data space 40 or virtual data space 42. The storage capacity of local memory space 54 is preferably at least as large as a block 39. More preferably, local memory space 54 is large enough to hold the contents of several blocks 39, so that data files larger than one block 39 may be transferred more efficiently.

An example of a computing system 22 will now be described. The example comprises a typical computer system (not shown) suitable for use in an office environment. The exemplary computer system uses the Microsoft Windows™ operating system. The processor 24 of the computer system is the microprocessor used to execute software and control peripheral devices. The data storage device 26 of the computer system is a single IDE-type HDD. The IDE-type HDD is operated by an IDE controller coupled between the processor at the HDD itself.

In the exemplary computer system, data protection controller 20 is coupled between the IDE controller and the HDD. Data protection controller 20 is transparent to the IDE controller. From the IDE controller's perspective, it appears to be communicating directly with the IDE HDD. As is more fully described below however, controller 20 in fact conceals at least a part of the IDE HDD from the IDE controller and may actually pretend to be two separate physical HDDs.

Although this first exemplary system includes only a single HDD, it is relevant to note that a computer system may include two or more IDE-type HDDs, usually operated by a single IDE controller. When more than one IDE-type HDD is included in a computer system, each HDD is assigned a "drive number", usually beginning at 0. (In systems with one IDE-type HDD, the single HDD is usually drive 0.) Each HDD may then be addressed separately by the computer's processor (and other components) by using each HDD's drive number. Some common IDE HD controllers may be coupled to two HDD using a single ribbon cable. The ribbon cable includes several control lines that use the drive number to identify the specific HDD that is being accessed during any read data or write data operation.

In an IDE-type HDD, the data storage space 38 is physically located on one or more disk surfaces that are physically divided into tracks and sectors. The data storage space 38 is divided into logical blocks 39, which may or may not correspond to the physical sectors. When used with the Windows operating system, an IDE HDD may be divided into multiple logical partitions, which are commonly referred to by different "drive letters". Normally, each partition in the computer system (on any HDD) must have a unique drive letter, which can be used by the processor. A HDD that is not divided in this way may be considered to have a single partition encompassing all of the HDD's data storage space and this single partition must have a unique drive letter.

In the present example, the computer system includes only a single IDE-type HDD which has been divided into three distinct logical partitions. The first partition is the protected data space 40, the second partition is the virtual data space 42 and third partition is the unprotected data space 43. The blocks 39 that comprise the first partition are the protected blocks 44. The blocks 39 that comprise the second partition are the virtual blocks 46. The blocks 39 that comprise the third partition are the unprotected blocks 47. The three partitions may be physically located in the data storage space of the HDD and may actually be physically interleaved with one another. As noted above, the number of protected blocks 44 and the number of unprotected blocks 46 is preferably equal, and preferably, there is a one-to-one relationship between the protected blocks 44 and the unprotected blocks 46.

An IDE HDD maintains a file allocation table (FAT) for each partition on the HDD. The FAT includes a record for each block 39 in the partition indicating whether the block is used or unused. If the block is used, the FAT further indicates which data file occupies the block and how the block is associated with one or more other blocks 39 that are also occupied by the same file. In the present example, the FAT for the first partition is the protected data storage table 50, the FAT for the second partition is the virtual data storage table 51 and the FAT for the third partition is the unprotected data storage table 53.

The operation of controller 20 will now be explained.

In use, protected data space 40 contains protected data that is to be protected from alteration or deletion, and the location of each piece of protected data will be recorded in protected data storage table 50.

Typically, this protected data is installed by a system administrator for the use of a user to whom computing system 22 is provided. Methods 100 and 200, described below, set out a procedure for installing the protected data in protected data space 40.

During each session in which computing system 22 is used, controller 20 initially considers virtual data space 42 to be blank. The entire virtual block usage table 52 is set to "0", indicating that each virtual block 46 does not contain valid virtual data.

As protected data is read from any protected block 44 in protected data space 40, the same data is concurrently recorded in the corresponding virtual block 46 in virtual data space 42 and virtual block usage table 52 is update to indicate that the virtual block 46 contains valid data.

When processor 24 makes a write request to add to, modify or delete the protected data, the change is not recorded in the protected block 44 in protected data space 40, but is recorded only in the corresponding virtual blocks 46 in virtual data space 42 as virtual data.

Virtual block usage table 52 is updated to indicate that the virtual block contains valid data.

Thus if processor 24 makes a read request for a protected data file (i.e. a word processor document), controller 20 reads the file from one or more protected blocks 44 in protected data space 40 and provides it to processor 24. Concurrently, controller 20 copies the requested data file into a corresponding set of virtual blocks 46 in virtual data space 42 as virtual data and updates virtual block usage table 52 to indicate that those blocks contain valid data.

After the file has been amended (i.e. using a word processor) it may be transmitted to controller 20 to be stored in data storage device 26.

Controller 20 records the modified data file only in virtual data space 42 as virtual data.

Since virtual data space 42 is considered to be blank at the start of each session during which computing system 22 is used, when a new session is started (for example, by turning computing system 22 off and on), the modified data file is lost. The original data file, which is still recorded in protected data space 40 as protected data, is treated as the current version of the data file.

When a read data or write data request is received relating to unprotected data space 43, controller 20 simply passes the request to data storage device 26. In the case of read data requests, controller 20 receives the requested read data from data storage device 26 and passes it on to processor 24. Controller 20 thus simply buffers read data, write data requests and the data itself when processor 24 makes a request relating to unprotected data space 43. This assumes that data storage device 26 is an intelligent device capable of independently satisfying read data and write data requests. The IDE HDD of the exemplary computer system is capable of such tasks. However, if controller 20 is used with a data storage device which requires controller 26 to directly control its read and write operations, controller 20 may be configured to do so, according to any data storage protocol. The operation of controller 20 in response to read data and write data requests is explained below in reference to method 300.

Figure 2:
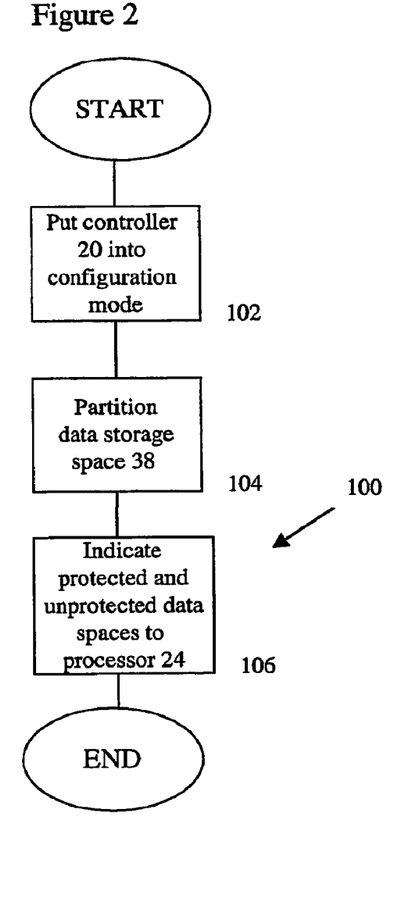
FIG. 2 illustrates a configuration method according to the present invention.

Reference is next made to FIG. 2 which illustrates a method 100 of configuring data storage device 26 so that data may be recorded in data storage space 38. Method 100 is carried out under the control of a system administrator, who configures computing system 22 for use by a user.

Method 100 begins in step 102 in which controller 20 is put into a configuration mode by the administrator. Typically, the administrator will put controller 20 into the configuration mode by executing Configuration software provided with controller 20 for this purpose. Preferably, the remainder of method 100 is performed under the control of the Configuration Software. The Configuration software is preferably provided with a password mechanism that prevents controller 20 from being put into configuration mode unless a correct password is provided.

Also, preferably, controller 20 may only be put into configuration mode if the Configuration software is executed when computing system 22 is turned on.

Method 100 next proceeds to step 104. Any data storage device 26 will have a maximum size which is typically expressed as the maximum number of 8-bit bytes of data that can be stored in its data storage space 38. In this step, the data storage space 38 of data storage device 26 is divided into protected data space 40, virtual data space 42 and unprotected data space 43.

Controller 20 displays a dialog box asking the administrator what size unprotected data space 43 is to be. In response to the selected size, controller 20 designates a corresponding portion of data storage space 38 as unprotected data space 43.

The remainder of data storage space 38 is divided into protected data space 40 and virtual data space 42.

Since protected data space 40 and virtual data space 42 are preferably the same size with a one-to-one correspondence between protected blocks 44 and virtual blocks 46, preferably, controller 20 will divide the remainder of data storage space 38 after the creation of unprotected data space 43 so that, to the extent possible, the number of protected blocks 44 and virtual blocks 46 (after the execution of method 110 (FIG. 2A)) will be equal.

In the exemplary computer system, step 104 will result in the data storage space 38 being divided into the three partitions described above.

Method 100 next proceeds to step 106 in which controller 20 indicates to processor 24 that computing system 22 contains two data storage devices, which may be referred to as "virtual data storage devices". Processor 24 is not informed of the "virtual" nature of the virtual data storage devices. Controller 20 indicates to processor 24 that the first virtual data storage device in computing system 22 has a capacity equal to that of protected data space 40 (which is preferably equal to, or at least smaller than virtual data space 42) and that the second virtual data storage device in computing system 22 has a capacity equal to that of unprotected data space 43. Controller 20 does not report the existence of or any details about virtual data space 42 to processor 24. Depending on the data I/O protocol used in computing device 22, controller 20 may be required to report specific characteristics of each of the two data storage devices it reports to processor 24. For example, controller 20 may be required to report a number of tracks, sectors and sector size that corresponds to the claimed size of each of the two data storage devices. Controller 20 is configured to determine values for these characteristics that correspond to the sizes of virtual data storage devices (i.e to the sizes of protected data space 40 and unprotected data space 43) and report them to processor 24. The values reported will exclude virtual data space 42. In other devices, such information may not be necessary, and all that may be required to report that usable size of the protected and unprotected data spaces.

Controller 20 may be said to masquerade as two separate virtual data storage devices, each of which corresponds to a logical partition on data storage device 26. Depending on the data I/O protocol used by computing system 22, processor 24 may subsequently identify the virtual data storage devices using different references. For example, in the exemplary computer, the two virtual data storage devices have different drive letters and drive numbers. Controller 20 will receive read data and write data requests for the different drive letters and translate them for use on the appropriate partition of the IDE HDD.

Since virtual data space 42 is concealed from processor 24, the effective usable storage data space on data storage device 26 is reduced by the size of virtual data space 42. For example, if data storage device 26 has a data storage space 38 with a capacity of 10 Megabytes (Mb), and if protected data space 40 is selected to have a data capacity of 4 Mb, then protected data space 40 and virtual data space 42 will both have a data capacity of 4 Mb each and the remaining space of 2MB will be allocated as unprotected data space 43. Virtual data space 42 is concealed from processor 24. Protected data space 40 appears to processor 24 as a 4MB data storage space and unprotected data space 43 appears to processor 24 as a 2MB data storage space.

Method 100 then ends.

After method 100 has been completed, processor 24 will operate as though computer system 22 contains two separate physical data storage devices. In the case of the exemplary computer system with a single IDE HDD divided into three partitions, processor will see the first partition as a first physical drive with a separate drive letter and drive number (eg. drive letter C: and drive number 0) and the third partition as a second physical drive with a separate drive letter and drive number (eg. drive letter D: and drive number 1). Processor 24 is unable to access virtual data space 42, since processor 24 is unaware of the existence of virtual data space 42.

Method 100 may be repeated to vary the size of the unprotected data space 43 and the sizes of the protected data space 40 and the virtual data space 42. If method 100 is performed for the first time on a data storage device 26 that already contains data, method 100 may be configured to move this data into protected data space 40 or unprotected data space 43, to the extent that the data fits in those data spaces, or to other data storage devices. If method 100 is performed on a HDD subsequently and the size of protected data space 40 or unprotected data space 43 is reduced so that the existing data in the data space will no longer fit, then some of this data may be lost, or alternatively, may be copied to a different location.

Figure 2A:
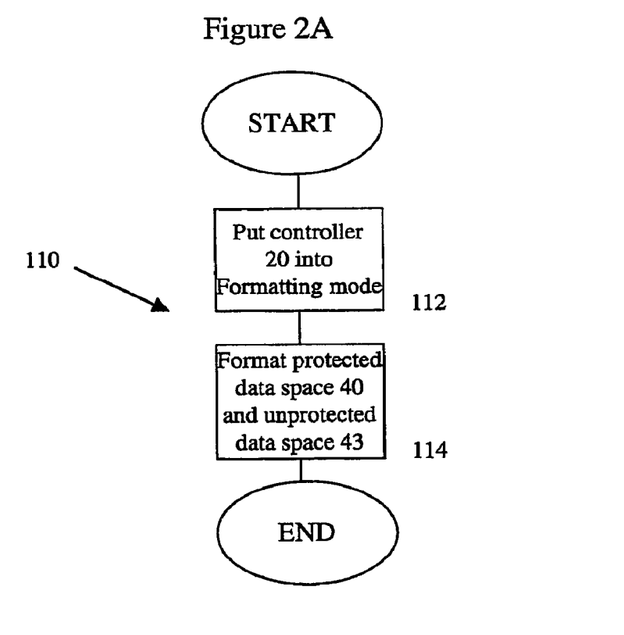
FIG. 2A Illustrates a formatting method according to the present invention.

Reference is next made to FIG. 2A which illustrates a method 110 of formatting protected data space 40 and unprotected data space 43 so that data may be recorded in protected data space 40 and unprotected data space 43. Method 110 is carried out under the control of a system administrator, who configures computing system 22 for use by a user.

Method 110 begins in step 112 in which controller 20 is put into a formatting mode by the administrator. Typically, the administrator will put controller 20 into the formatting mode by executing Formatting software provided with controller 20 for this purpose.

Method 110 next proceeds to step 114. In step 114 the protected data space 40 and unprotected data space 43 are formatted. In many cases, data storage spaces 40 and 43 will require formatting specific to the type and nature of the computing system 22 to which it is coupled.

This formatting creates protected data: storage table 50 and protected blocks 44 and also unprotected data storage table 53 and unprotected blocks 47.

In the exemplary computer system, the Windows operating system includes utility programs for performing this format. The Windows utility programs "Fdisk" and "Format" are used to create protected data storage table 50 and protected data blocks 44 and also unprotected data storage table 53 and unprotected data blocks 47.

Method 110 then ends.

Figure 3:
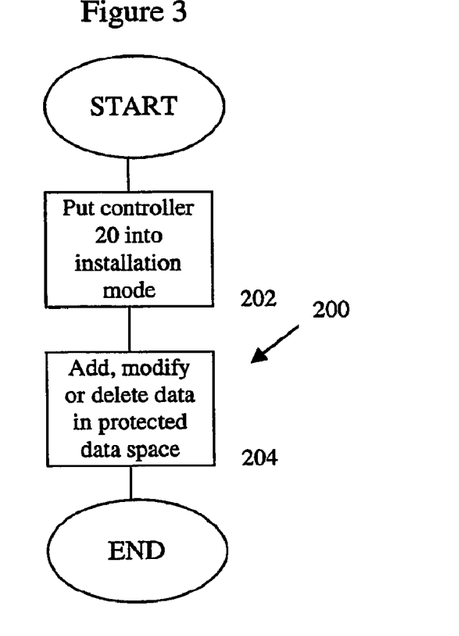
FIG. 3 illustrates an installation method according to the present invention.

Reference is next made to FIG. 3 which illustrates a method 200 for installing data in the protected data space 40 of data storage device 26. Method 200 is also typically carried out under the control of the system administrator.

Method 200 begins in step 202, in which controller 20 is put into an installation mode by the administrator. Typically, this is done by executing installation software provided with controller 20 for this purpose. The installation software preferably includes a password protection mechanism requiring the administrator to enter a password before controller 20 will enter the installation mode. Preferably, controller 20 can only be put into installation mode when computer system 22 is turned on.

Method 200 next proceeds to step 204, in which the administrator may load data into protected data space 40. For example, the administrator may load an operating system used for controlling processor 24 and other parts of computing system 22 (not shown), application software such as word processors, games or communication software and data files. The specific data loaded into data space 40 will depend on the nature and intended use of computing system 22. During installation mode, the administrator may also delete and edit data recorded in protected data space 40. While the administrator is adding, deleting and modifying data in the protected data space 40, protected data storage table 50 is kept up to date by data storage device 26, so that data storage table 50 contains a record of the location of all data stored in protected data space 40.

During step 204, the administrator does not record any information in virtual data space 42.

In the exemplary computer system, step 204 may involve the installation of an operating system such as Microsoft Windows™ and application software such as Microsoft Words™ on the IDE HDD. Other software and data may also be installed in the protected data space 40. The processor will see and refer to the protected data partition as drive letter C:, for example and the IDE HDD will maintain the FAT table for the protected data partition to indicate the location of all the installed software and data, using the file names assigned by the administrator.

Method 200 ends when the administrator has completed the installation of protected data into protected data space 40. Once method 200 ends, data recorded in protected data space 40 is referred to as protected data.

Once the protected data has been installed in protected data space 40, computing system 22 is ready for normal operation. Typically, computing system 22 will be provided to a user at this stage for regular use. Method 200 may be repeated by the administrator to modify the contents of protected data space 40. During such subsequent iterations of method 200, protected data storage table 50 is kept up to date by data storage device 26 (or by controller 20, depending on the protocol used by data storage device 26). The administrator does not record any information that is to be permanently protected in virtual data space 42.

Figure 4A:
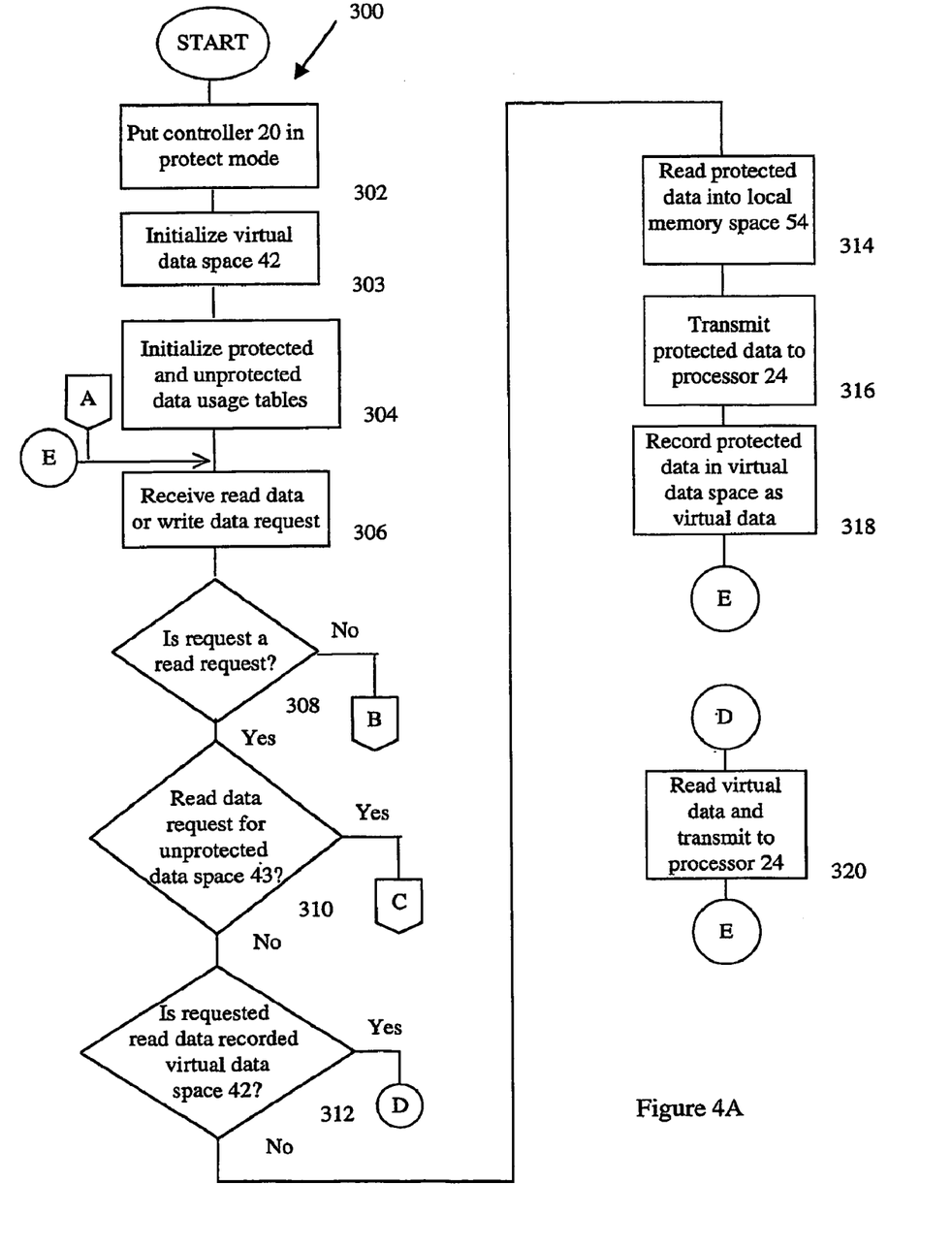
FIGS. 4A and 4B illustrate the operation of the controller of FIG. 1 in a protect mode.
Figure 4B:
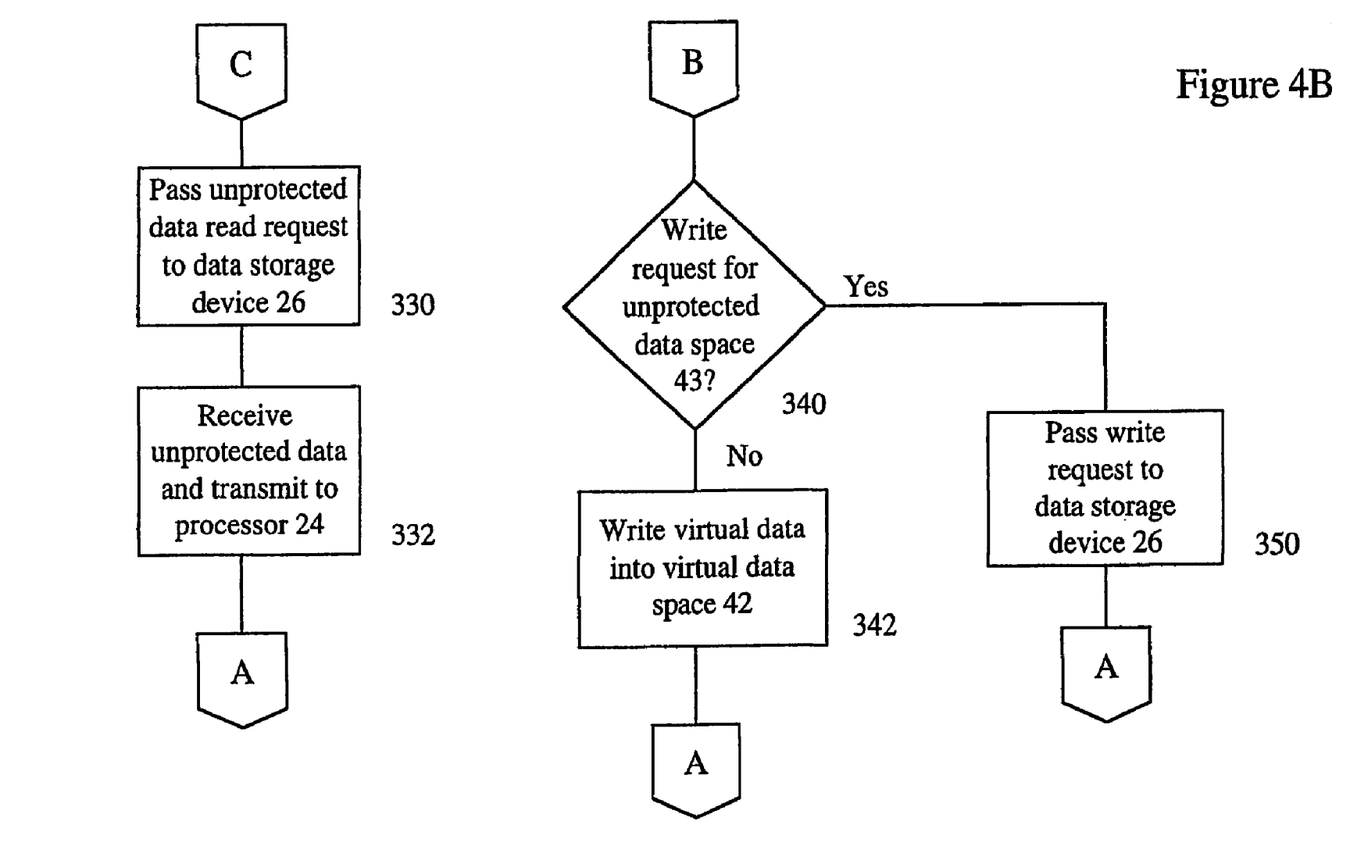

Reference is next made to FIGS. 4A and 4B, which illustrate a method 300 by which controller 20 operates during its normal operation. In method 300, a request from processor 24 for data previously recorded in data storage device 26 is referred to as a "read request" and the requested data is referred to as "read data". A request from processor 24 to record data in data storage device 26 is referred to as a "write request" and tile data to be written is referred to as "write data".

Method 300 begins in step 302, in which controller is put into a protect mode. Controller 20 is configured to automatically enter protect mode when a session of use of computing system 22 is initiated, unless controller 20 is specifically put into configuration mode (method 100) or installation mode (method 200). A session of use of computing system 22 is typically initiated by turning computing system 22 on or by resetting it.

Method 300 next proceeds to step 303, in which controller 20 initializes virtual data space 42. Controller 20 sets the value of every bit in virtual block usage table 52 to "0" to indicate that all of the virtual blocks 46 do not contain valid data. Controller 20 also deletes the contents of the virtual data storage table, so it indicates that all of the virtual blocks 46 are unused. The effect of step 303 is that any virtual data recorded in virtual data space 42 during a previous session of use computing system 22 is effectively discarded. Controller 20 does not actually delete the contents of every virtual block 46, since that may require a substantial amount of time, causing the startup procedure of computing system 22 to be substantially lengthened. However, such a deletion is not necessary. Any data that was recorded in a virtual block 46 will be ignored by controller 20 since each block is marked as "not valid" in virtual block usage table 52 and as "unused" in virtual data storage table 51.

Some computing systems allow a processor 24 to make "low level" data I/O requests by specifically directing a data storage device 26 to access a specific part of its data storage space 38. For example, a processor may instruct an IDE HDD to provide contents of a specific block 39 based on a physical track and sector number. When used with an IDE HDD, controller 20 will have reported track and sector limitations corresponding to the sizes of protected data partition 40 and unprotected data partititon 43 to processor in step 106.

If processor 24 attempts to obtain data from the virtual data space 42 using such low-level I/O requests, controller 20 wig receive the requests, since it is coupled between processor 24 and data storage device. If the request is for data that is for a block that is either invalid or unused, controller 20 will simply refuse to satisfy the request. As a result, even if a malicious user of computing system 22 is aware of the usage of controller 20 and the presence of virtual data space 42 on data storage device 26, the malicious user will not able to utilize data recorded in virtual data space 42 unless that data was recorded in virtual data space 42 during the current session of use of computing system 22.

Method 300 next proceeds to step 304. In this step, controller 20 reads the protected data storage table 50 from data storage device 26 into its internal protected space usage table 48. Controller 20 initializes its internal virtual space usage table 49 so that, like virtual data storage table 51 and virtual block usage table 52, it indicates that every virtual block 46 is "not valid" and "unused".

Protected space usage table 48 is used to allow the information in protected data storage table 50 to be accessed more rapidly during method 300. Virtual space usage table 49 is used to allow the information in virtual data storage table 51 and virtual block usage table 52 to be accessed more rapidly during method 300. Since the information in both protected space usage table 48 and in virtual space usage table 49 could be obtained directly from the underlying tables (50, 51 and 52), which are physically recorded in data storage device 26, their usage is optional.

Method 300 next proceeds to step 306 in which a read request or a write request is received from processor 26.

Method 300 next proceeds to decision step 308. If the request received in step 306 is a read request, method 300 proceeds to decision step 310. Otherwise, method 300 proceeds to decision step 340.

In decision step 310, the read request is reviewed. If the read request is for unprotected data recorded in unprotected data space 43, then method 300 proceeds to step 330. Otherwise, method 300 proceeds to decision step 312.

In decision step 312, controller 20 reviews virtual data usage table 49 to determine if the read data requested by processor 24 is recorded in virtual data space 42. If so, method 300 proceeds to step 320. Otherwise, method 300 proceeds to step 314.

In step 314, controller 20 reviews protected data usage table 48 to determine which protected block or blocks 44 the read data is recorded in and reads it into local memory space 54. The data read in this step is protected data originally recorded in data space 40 by the administrator in step 204.

Method 300 next proceeds to step 316, in which the protected data read from protected data space 40 in step 314 is transmitted to processor 26.

Method 300 next proceeds to step 318, in which the protected data read from protected data space 40 in step 314 is recorded in virtual data space 42. Controller 20 determines which virtual block or blocks 46 correspond to the protected block or blocks 44 from which the read data was read in step 314 and records a copy of the read data in those virtual block or blocks 46. Data storage device 26 will update virtual data storage table 51 to indicate that the corresponding virtual block or blocks 46 are used and to indicate their contents. Controller 20 also updates virtual block usage table 52 to indicate that the corresponding virtual block or blocks now contain valid virtual data.

Controller 20 updates its virtual data usage table 49 to reflect the updates to virtual data storage table 51 and virtual block usage table 52.

Method 300 next returns to step 306 to await the next request from processor 24.

In step 320, controller 20 processes read requests for read data which has previously been recorded in virtual data space 42. The read data, which is virtual data, may have been recorded in virtual data space (i) in step 318, in which read data from protected data space 40 is copied into virtual data space 42 or (ii) step 342 (described below) in which write data is written in virtual data space in response to a write request from processor 24.

Controller 20 determines which virtual block or blocks 46 the requested virtual data is stored in. Controller 20 reads the data from these blocks and transmits it to processor 24.

Method 300 then returns to step 306 to await the next request from processor 24.

In step 330, controller 20 processes read requests for unprotected data recorded in unprotected data space 43. Controller 20 simply passes the read request from processor 24 to data storage device 26.

Method 300 next process to step 332 in which controller 20 receives the requested unprotected data from data storage device 26, which has obtained the unprotected data from unprotected data space 43. Controller 20 transmits the unprotected data to processor 20.

Method 300 then returns to step 306 to await the next request from processor 24.

In decision step 340, controller 20 begins the processing of a write request from processor 24. If the write request relates to unprotected data to be stored in unprotected data space 43, method 300 proceeds to step 350. Otherwise, the write data is to be recorded in virtual data space 42 and method 300 proceeds to step 342.

In step 342, controller 20 determines which virtual block or blocks 46 the write data should be written into. If the write data corresponds to data previously read from protected blocks 44 in protected data space 40, then the write data may be written into virtual blocks 46 corresponding to those protected blocks 44. If the write data is new data which has been created by the user of computing system 22, then controller 20 will select a virtual block or blocks 46 which is recorded as "unused" in virtual data storage table 51 and in virtual space usage table 49. Controller 20 records the write data in the selected virtual block or blocks 46. Data storage device 26 will update virtual data storage table 51 to indicate that the corresponding virtual block or blocks 46 are used and to indicate their contents. Controller 20 also updates virtual block usage table 52 to indicate that the corresponding virtual block or blocks now contain valid virtual data.

Controller 20 updates its virtual data usage table 49 to reflect the updates to virtual data storage table 51 and virtual block usage table 52.

If a particular virtual block 46 that was previously used to store virtual data is no longer required to record data (for example, where the data file has become shorter or where a data file is deleted), data storage device 26 modifies virtual data storage table 51 to indicate that the block is unused. However, virtual block usage table 52 will still indicate that the block contains valid data. This allows a virtual block which previously contained virtual data (or which may never have contained virtual data) to be treated as blank, thereby allowing the virtual block to be subsequently used to store other virtual data. The collective meanings of the used/unused indication in virtual data storage table 51 and the valid/not valid indication in virtual block usage table 52 for each virtual block 46 are summarized in following table:

| Indication in Virtual Data Storage Table 51 | Indication in Virtual Block Usage Table 52 | |
| --- | --- | --- |
| | Valid<br>Virtual block currently contains virtual data. | Not Valid<br>Erroneous combination - should not occur |
| Used | 1. The virtual block previously contained virtual data which has now been deleted - the virtual block is now unused and available for storing new virtual data. | Virtual block has never been used for virtual data |
| Unused | 2. The virtual block never contained virtual data - controller 20 was directed by processor 24 to delete the corresponding protected block - the virtual block is unused and is available for storing new virtual data. | |

Once a particular virtual block has been identified as valid in virtual block usage table 52, it remains valid until a new session of use of computing device 22 is started, at which time all virtual blocks are identified as invalid in step 303.

In the exemplary computer system, the IDE HDD of the exemplary computer system may maintain its FAT table for both the protected data space 40 and virtual data space 42 accurately during write requests for virtual data. The data storage table 48 of controller 28 is independent of virtual data storage table 51, since the virtual data storage table 51 is not read into data storage table in step 304.

Method 300 then returns to step 306 to await the next request from processor 24.

In step 350, controller 20 processes write requests relating to unprotected data space 43. Controller 20 simply passes these requests on to data storage device 26. If data storage device 26 provides an acknowledgement that the write request has been successfully completed or an error indication signifying that it cannot be completed, controller passes the acknowledgement or error indication to processor 24.

Method 300 then returns to step 306 to await the next request from processor 24.

When it is in protect mode (method 400), controller 20 does not write any data into protected data space 40. As a result, protected data space 40 always has the same contents is it had when method 200 ended (or was last performed to modify the contents of protected data space 40). During a single session of use of computing system 22, changes, additions and deletions to the protected data are recorded only in virtual data space 42 as virtual data in step 342. As far as processor 24 is concerned, it appears to be making regular read data and write data requests to data storage device 26, and these requests appear to be satisfied in a routine manner. However, when a new session of use of computing device 22 is initiated, all of these changes are lost, due to step 303.

The first time that any protected data is protected data space 40 is read by controller 20 to satisfy a read data request, the protected data is copied into virtual data space 42 as virtual data (in step 318). This is done so that future read requests for the same data can be satisfied more quickly by controller 20, since the data will now be in virtual data space 42, allowing controller 20 to go from step 312 step 320. Also, making this copy will build up virtual data space 42 so that it contains an increasingly complete copy of protected data space 40 as well as any modifications or additions to the protected data (as is described below in relation to step 342). During a lengthy session of use of computing device 22, an increasing number of read requests may be satisfied by reading virtual data from virtual data space 42 rather than by reading protected data from protected data space 40.

Step 318 is optional. Alternatively, all read data requests for protected data could be satisfied by reading the protected data directly from protected data space 40. In this alternative embodiment the virtual data record in virtual data space 42 would include only additions to modifications to and deletions of protected data.

The present invention has been described in an embodiment suitable for a computing system 22 which is set up by an administrator (using methods 100 and 200) to have all data (including an operating system and any software applications) required by a user to perform the user's computing tasks pre recorded in the protected data space 40 as protected data. An example of such a computing system is a computer used in an office environment where the user primarily uses a fixed set of applications to accomplish his or her work.

The user can not make permanent modifications to the software and data recorded in the protected data space 40.

The user may make temporary changes (which will only be recorded in virtual data space 42) to the protected data, or may permanently record unprotected data in unprotected data space 43, where it will be retained from one session to the next. If the user makes any changes to the protected data in the computer, the changes may removed by simply resetting controller 20 by beginning a new session of use of the computer by either turning the computer off and on or otherwise resetting the computer. Similarly, any attempt by a virus or other malicious action which is intended to modify the protected data will be rendered ineffective, since the protected data space is never modified in protect mode. In a typical office environment, the use of controller 20 can substantially reduce the number and complexity of "help-desk" calls by computer users.

In the context of the exemplary computer system, and from the perspective of the processor 24, method 100 sets up two virtual data storage devices (i.e. a C: drive and D: drive, in the context of the exemplary computer system). In method 200, the C: drive is loaded with information that will be subsequently protected. In method 300, the C: drive may be modified but the modifications will be lost at the end of the current session and the D: drive may be permanently modified. The presence and usage of the virtual data space 42 to protect the protected data space 40 is entirely concealed.

Controller 20 provides strong protection for the protected data recorded in protected data space 40. Controller 20 implements a hardware solution which does not require the execution of any software by processor 24 during the protect mode. Accordingly, a virus or other malicious program cannot detect the presence of controller 20 by simply determining whether BIOS calls for read requests and write requests are being interrupted. Furthermore, controller 20 provides an entirely transparent layer between data storage device 26 and processor 24, with the exception that a portion of the data storage space equal to the size of the virtual data space 42 is concealed from processor 24.

Since controller 20 is transparent to processor 24, it may be used regardless of the operating system installed on computing system 22 Furthermore, the same controller 20 may be used with any processor or other hardware that utilizes the same protocol and controller interface 34. This is increasingly advantageous in the modern computing environment in which some standard memory and data storage protocols and interfaces are used in a wide variety of devices. For examples, games, hand held devices, internet capable cellular phones and many other device may share that same data storage devices and protocols.

Since controller 20 actively controls read and write operations on data storage device 26, controller 20 is configured to communicate with data storage device using the appropriate data i/o protocol and to provide any necessary control instructions or signals in accordance with that protocol. In the exemplary computer system, controller 20 may require some or all of the capabilities of a typical IDE HDD controller in order to operate the IDE HDD. Thus far, controller 20 has been described as being coupled between such a typical IDE HDD controller and the IDE HDD. In fact, controller 20 may be provided in an integrated form that may be combined with a a typical IDE HDD in a single unit. The single unit will communicate with processor 24 as though it controls two separate physical HDD units, but will in fact convert the read data and write data requests and process them within the three partitions on the single HDD installed within computing system 22.

The duplication of data on data storage device is a relatively low cost solution to the problem of data protection. Modern day hard disk drives and other data storage devices have substantial data storage capacities and are cost effective compared to earlier devices. As a result, it is not impractical to purchase a 40 Mb or larger data storage device, and it is not unreasonable to allocate a portion of the storage space as a virtual data space to protect a protected data space of equal size.

The present invention is capable of many variations and modifications. Some of these are described below.

Figure 5:
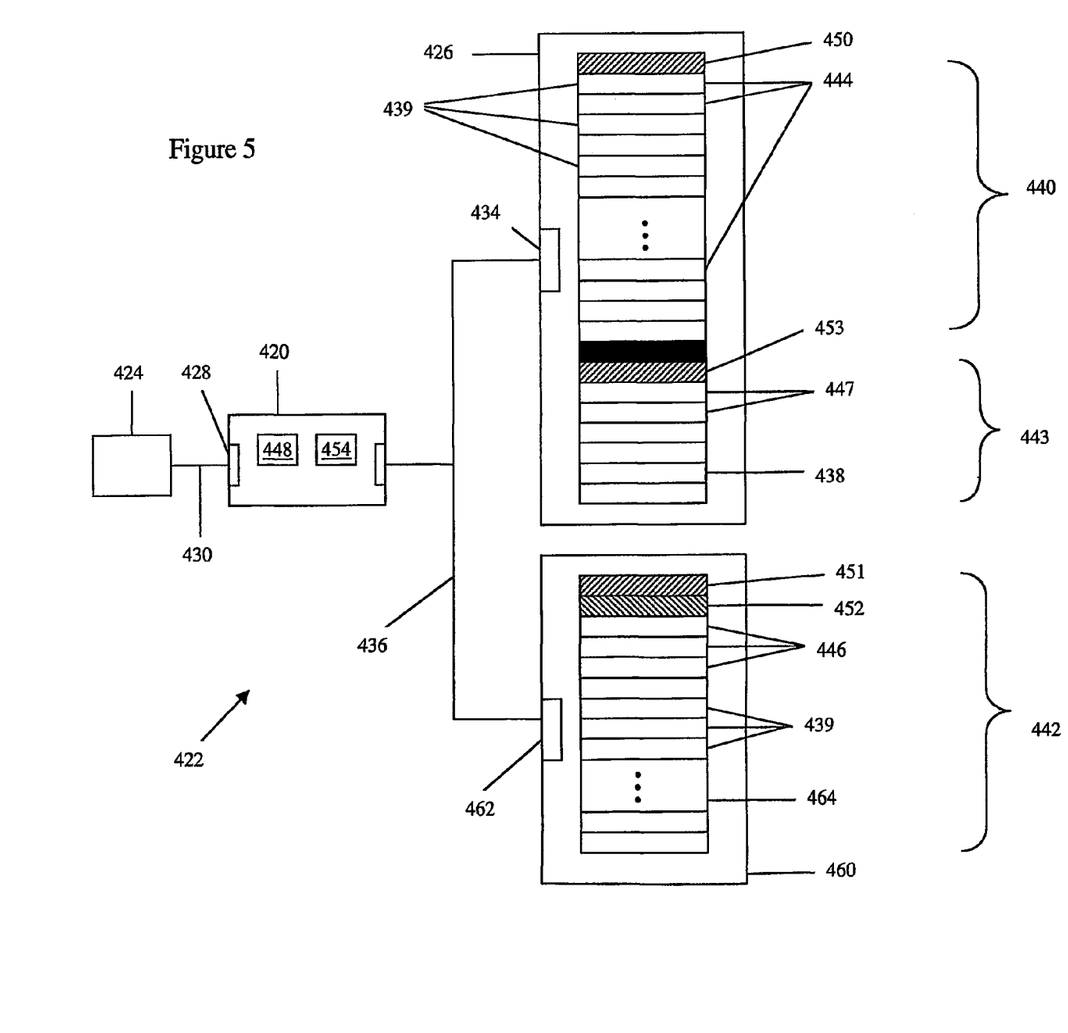
FIG. 5 is a block diagram of a second computing system incorporating a second embodiment of the present invention.

Reference is next made to FIG. 5, which illustrates a computing system 422 incorporating a second embodiment 420 of the present invention. In FIG. 5, components that are identical or comparable to those of FIG. 1 are identified using the reference numerals of FIG. 1, increased by 400.

Computing system 422 includes two data storage devices 426 and 460. Data storage device 426 has a data storage space 438 which includes a protected data space 440, protected data storage table 450, unprotected data space 443 and an unprotected data storage table 453, all of which operate in the same manner as the corresponding components of data storage device 26.

Data storage device 460 has includes controller interface 462 and a data storage space 464. Data storage device 460 is coupled to controller 462 using storage device data bus 436. Virtual data space 442 and the associated virtual data storage table are located in data storage space 464. Virtual data space 442 and virtual data storage table 451 operate in the same manner as the corresponding components of data storage device 426.

Controller 420 is configured to operate both data storage devices 426 and 460. Controller 420 maintains the contents of virtual data space 442 in the same manner as described above in relation to computing system 22. Since the entire data storage space 464 of data storage device 460 is used for virtual data space 442, controller 420 actually conceals the presence of data storage device from processor 424. Controller 420 still reports that it contains two physical storage devices. The first corresponds to protected data space 440 and the second corresponds to unprotected data space 443, both of which are located on data storage device 426.

Computing system 422 has the advantage that none of the data storage space 438 is used by controller 420 for virtual data space 442, and therefore processor 424 is able to access the entire data storage space 438. This embodiment may be preferable when the present invention is added to an existing computing device and it is desirable not to reduce the overall data storage space available to processor 424.

Since part of data storage space 438 is used for unprotected data space 443, data storage space 464 need be only as large as data storage space 440. Accordingly, data storage device 460 may have a smaller capacity than data storage device 426. Alternatively, if data storage device 460 has the same capacity as data storage device 426, the excess data storage space in data storage device 460 may be used as a second unprotected data space, which controller 420 does not conceal from processor 420. Such a second data storage space will be presented to processor 424 as a third data storage device with a separate drive letter and drive number (for example, drive letter E: and drive number 2).

Reference is again made to FIG. 1. Computing system 22 and controller 20 are configured to eliminate any change made by a user to protected data during protect by recording all such changes in virtual data space 42 and then ignoring virtual data space 42 at the beginning of each session of use of computing system 22 by initializing virtual data storage table 51 and virtual block usage table 52. In another embodiment of the present invention, it may be preferable in some environments to allow such changes to be retained between sessions, while still allowing the changes to be discarded if desired. This may be done by simply reading in the virtual data storage table 51 and virtual block usage table 52 into the virtual data usage table 49 of controller 20 during step 304, at the same time that protected data usage table 50 is read. In this case, a "Discard virtual data space" utility is provided with controller 20 to allow the administrator to reset controller 20 to delete its data storage table and then read in only the protected data storage table 50 from data storage device 26. Preferably, the Discard virtual data space utility is maintained on a separate disk from data storage device 26 (and any other data storage device accessible to processor 26 during protect mode) and may only be activated with a password in order to ensure that a virus or other malicious program or user does not use the utility to destroy data recorded by the user in virtual data space 42. Preferably, the Discard virtual data space utility may be utilized only at the beginning of a session of use of the computing system. This embodiment may be particularly useful in a school teaching environment where a student may use a computer for one academic term, following which the computer may be reset for use by another student.

It may be desirable to allow changes recorded in virtual data space 42 to be made permanent by recording them in protection data space 40. If so, a "Copy virtual data to protected data space" utility may be provided. This utility is configured to allow the administrator to copy all virtual data recorded in virtual data space 42 into the corresponding protected data space 40 and simultaneously update protected data storage table 50 and protected space usage table 48. This utility should include password protection to prevent it from being initiated without authorization. If necessary, it may require the use of a physical key plugged into controller to ensure that an unauthorized user does not make undesirable changes permanent.

A combination of (i) allowing data in the virtual data space to be retained, (ii) a Discard virtual data space utility and a (iii) a Copy virtual data to protected data space utility may be useful in an environment where the configuration of a computing system is being modified. If a modification causes the computing system to become unstable or is otherwise undesirable, it may be discarded by discarding the contents of virtual data space 42. If the modification is desirable, then it may be made permanent by copying it into the protected data space 40.

Computing system 22 incorporates an unprotected data space 43. This is appropriate and may be necessary when computing device is used independently from any other computing device. When computing device 22 is used in a networked environment, it may be preferable to require all users of such computing devices to record all data they create on a shared storage space on a network server. If so, it may be desirable to eliminate unprotected data space 43 from data storage device 26 and simply designate a portion of the network server's data storage space to be the unprotected data space 43 for computing system 22.

An example with an IDE HDD has been provided. The present invention is equally suitable for use with other storage devices such as ISA, ATA, EIDE, SCSI and other hard disk drives. In addition, the invention is compatible with and suitable for use any other data storage device, including solid state memory devices, including magnetic memory devices, flash cards, PC cards, etc.

The present invention may be combined with other reliability and protection tools such as RAID (redundant array of independent disks) technology. In a RAID system, a controller such as controller 20 or 420 may be inserted between the RAID controller and one or more redundant hard disk drives. The controller and the associated disk drives may then be configured as described above. This configuration allows redundancy control (provided by the RAID configuration) to be supplemented by the data protection technology of the present invention. It can be noted that RAID technology by itself does not ensure that data on a disk will be protected. It only insures redundancy and may allow for data error correction. If a virus is recorded on a disk drive protected by RAID, then the virus will simply be recorded on all redundant drives. The RAID technology provides no mechanism for removing the virus.

Several exemplary embodiments of the present invention have been described. Many other variations that fit within the scope of the present invention are possible. The scope of the present invention is limited only by the claims which follow.

We claim:

1. A system to protect data, comprising:
    a processor;
    at least one data storage device;
    a data protection controller, the data protection controller connectable to the processor for receiving read and write requests from the processor and for transmitting a result to the processor, and the data protection controller connectable to the at least one data storage device for controlling the use of the at least one data storage device; and
    computer logic embodied in the data protection controller, the computer logic and data protection controller to:
        divide a data space provided by the at least one data storage device into a protected data space, a virtual data space associated with the protected data space and an unprotected data space;
        present, to the processor only the protected and unprotected data spaces, so that the processor is unaware of the virtual data space during one mode of operation;
        accept read requests from the processor;
        determine if the read request is for data that is either in the protected data space or the unprotected data space; and
        if the read request is for data in the protected data space, processing the read request such that:
            only if requested data is not yet in the virtual data space, reading said requested data from the protected data space and writing said requested data into the virtual data space for future use; and
            if the requested data is in the virtual data space, reading the requested data from the virtual data space.

2. The system according to claim 1, wherein if the read request is for data in the unprotected data space, reading the requested data from the unprotected data space.

3. The system according to claim 1, wherein the computer logic and data protection controller further:
    accept write requests from the processor;
    determine if the write request is for a location in the protected data space or the unprotected data space; and
        if the write request is for data in the protected data space, processing the write request such that data is written to the virtual data space and not the protected data space;
        if the write request is for data in the unprotected data space, processing the write request such that data is written to the unprotected data space.

4. The system according to claim 1, wherein the data protection controller is configured to mimic the operation of the interface of the at least one data storage device, thereby making the controlling interface transparent to the processor.

5. The system according to claim 1, further comprising memory for storing a record of each portion of the protected data space that is used to record whether each portion of the protected data space is in use, and if it is in use, the specific data recorded in that portion of the protected data space and the relationship of that portion to other portions within the protected data space.

6. The system according to claim 1, further comprising memory for providing a buffer space for storing data during read or write requests.

7. The system according to claim 1, further comprising memory for storing a record of each portion of the virtual data space that is used to record whether each portion of the virtual data space contains valid data and is in use, and if it is in use, the specific data recorded in that portion of the virtual data space and the relationship of that portion to other portions within the virtual data space.

8. The system according to claim 1, wherein the computer logic further includes instructions for a configuration mode, the configuration mode instructions comprising:
    dividing the data space provided by the data storage device into the protected data space, the virtual data space associated with the protected data space and the unprotected data space;
    providing a virtual data space usage table for storing a record of which portions of the virtual data space contain valid data; and
    invalidating the data in the virtual data space after a session is over or a new session is started.

9. The system according to claim 1, wherein the computer logic further includes instructions for an installation mode, the installation mode instructions comprising:
    presenting, to the processor only the protected and unprotected data spaces, such that the processor is unaware of the virtual data space during normal operation and forcing the processor to treat the protected and unprotected data spaces as separate devices; and
    preventing the processor from directly accessing a data storage device that is connected to the data device interface.

* * * * *